United States Patent [19]

Tanaka et al.

[11] Patent Number: 4,760,321
[45] Date of Patent: Jul. 26, 1988

[54] AC MOTOR DRIVE APPARATUS

[75] Inventors: Shigeru Tanaka, Tokyo; Susumu Tadakuma, Atsugi, both of Japan

[73] Assignee: Kabushiki Kaisha Toshiba, Kawasaki, Japan

[21] Appl. No.: 71,395

[22] Filed: Jul. 9, 1987

[30] Foreign Application Priority Data

Jul. 14, 1986 [JP] Japan .............................. 61-165028
Jul. 30, 1986 [JP] Japan .............................. 61-179115

[51] Int. Cl.⁴ ............................................ H02P 5/28
[52] U.S. Cl. ...................................... 318/809; 363/10; 363/160; 318/729
[58] Field of Search .................. 318/800, 729, 809; 363/160, 161, 162

[56] References Cited

U.S. PATENT DOCUMENTS 3,959,720  5/1976  Bose et al. .......................... 363/160
4,418,380 11/1983  Tanaka ................................ 363/10
4,570,214  2/1986  Tanaka ............................... 363/160
4,673,823  6/1987  Tanaka ............................... 307/11
4,674,026  6/1987  Tanaka ............................... 363/161

OTHER PUBLICATIONS

International Power Electronics Conference Record: Okuyama et al; Mar. 27, 1983; P720-P731; IPEC—Tokyo 1983.

Primary Examiner—William M. Shoop, Jr.
Assistant Examiner—Brian Young
Attorney, Agent, or Firm—Oblon, Fisher, Spivak, McClelland & Maier

[57] ABSTRACT

An AC motor drive apparatus of this invention is constituted by an AC power source, a first circulating current type cycloconverter having an output terminal coupled to the AC power source, a phase-advanced capacitor coupled to an input terminal of the first cycloconverter, a second circulating current type cycloconverter having an input terminal coupled to the phase-advanced capacitor, and an AC motor coupled to an output terminal of the second cycloconverter. The first cycloconverter controls a current supplied from the AC power source to be a sine wave in the same phase as that of the power source voltage, so that a voltage crest value of the phase-advanced capacitor becomes substantially constant. The second cycloconverter supplies a sine wave current of a variable frequency to the AC motor.

15 Claims, 9 Drawing Sheets

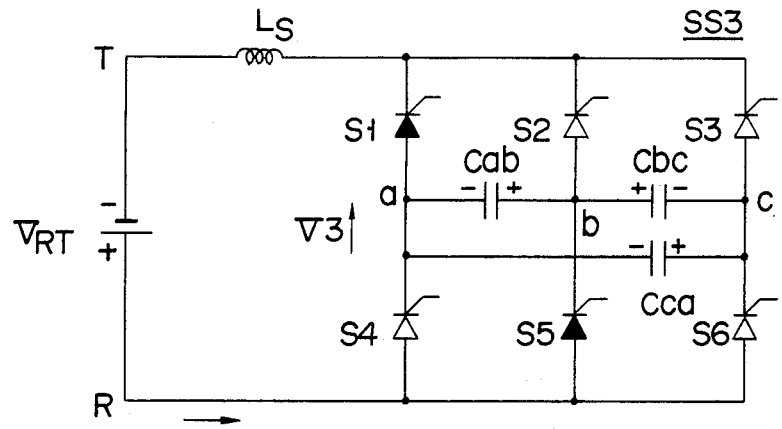
FIG. 4
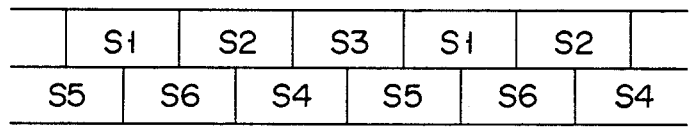
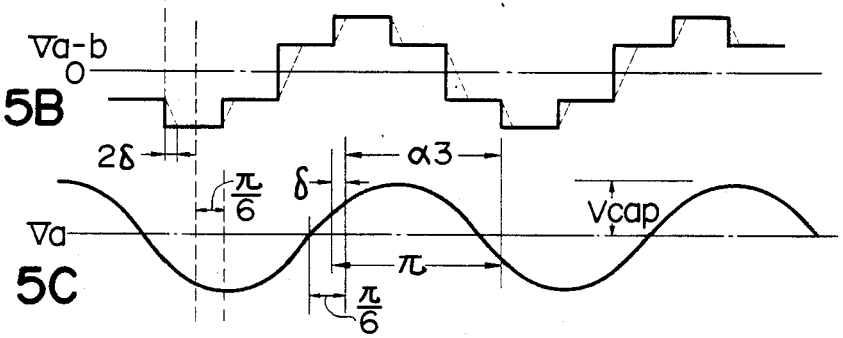
FIG. 5A
FIG. 5B
FIG. 5C

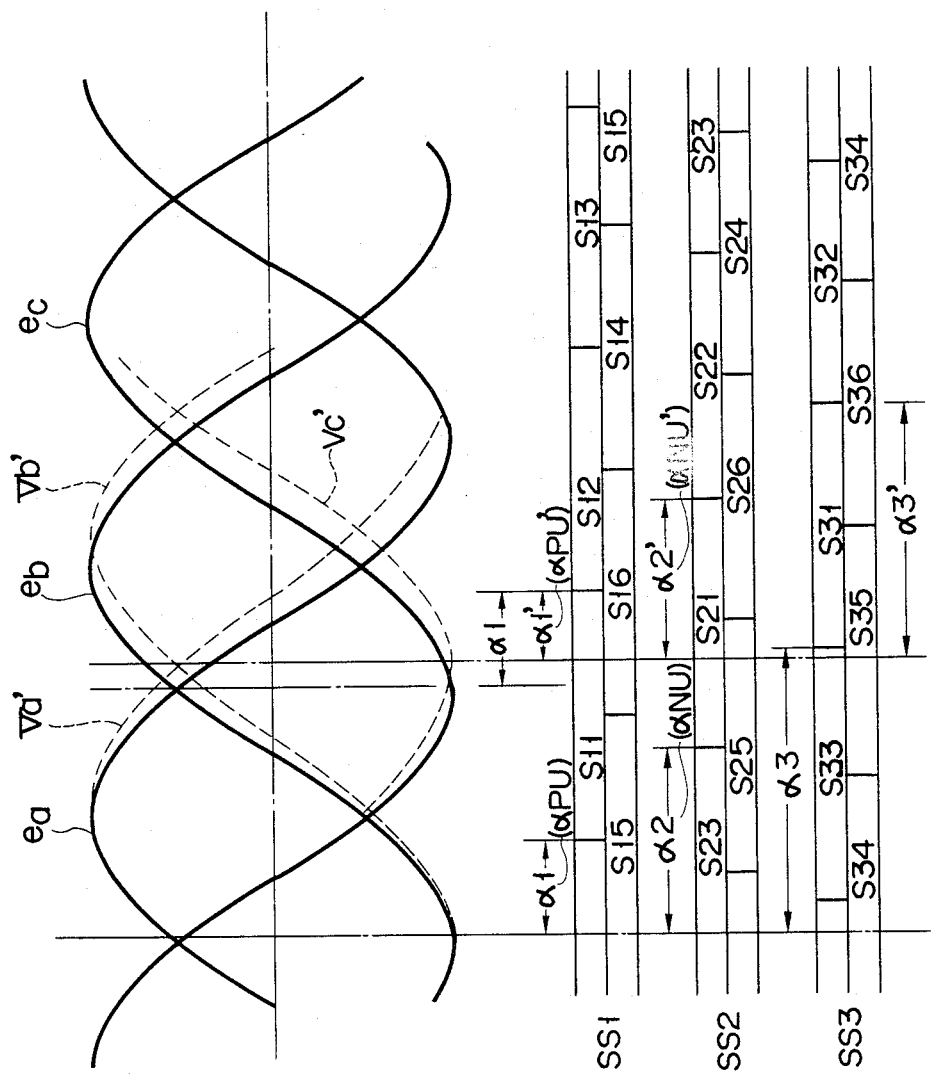
F I G. 6A
F I G. 6B
F I G. 6C
F I G. 6D

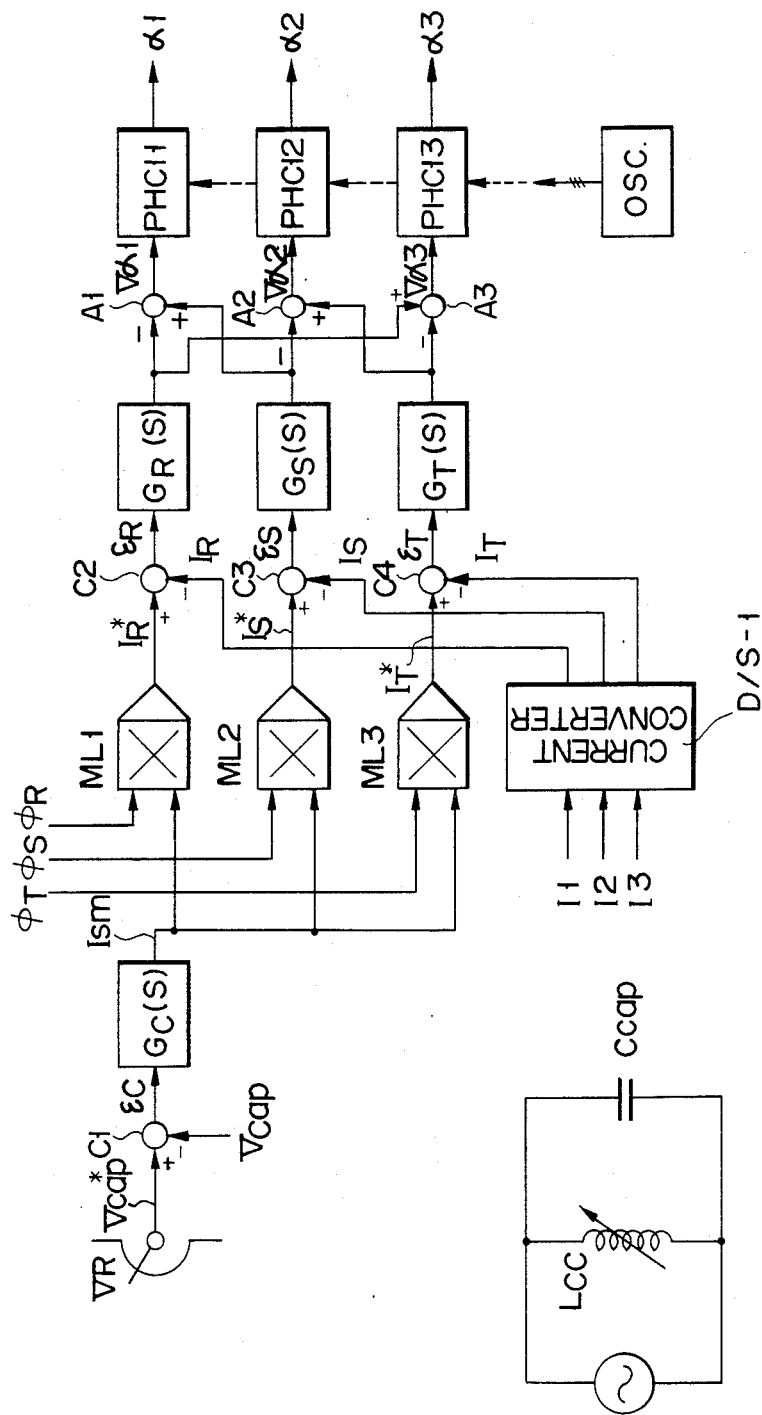
F I G. 8
F I G. 7

AC MOTOR DRIVE APPARATUS

BACKGROUND OF THE INVENTION

The present invention relates to a high-speed, large-capacity AC motor drive apparatus which is utilized for an iron-steel rolling mill, a water pump, a tunnel evacuation blower, or the like.

Motors can be primarily classified into DC motors and AC motors. The former produces small torque ripples and good controllability, and can be easily handled. As a result, DC motors have been used in a wide field of applications. DC motors do, however, require cumbersome maintenance for their brushes and commutators, and there are limitations on their maximum operating speed and/or maximum capacity. Therefore, DC motors have tended to be replaced by AC variable-speed motors.

Typical AC motors include induction motors and synchronous motors. Although AC motors also include reluctance motors and hysteresis motors, they have a considerably narrower field of applications.

A commutatorless motor is known, in which a counterelectromotive force of a synchronous motor is used to naturally commutate a thyristor inverter. Since the commutatorless motor utilizes natural commutation, it can easily have a large capacity, has similar controllability to that of the DC motors, and can be used in a wide range of applications. However, since the commutatorless motor requires a field pole, the overall motor device becomes bulky, and has a small overload strength, due to the limitations on natural commutation.

An inductance motor, in particular, a squirrel-cage induction motor, has a simple structure, is rigid, and can be easily handled. However, this motor requires a self-excited inverter, and a converter, used together with the motor, is subjected to certain limitations.

Nowadays, self-extinction elements such as transistors, GTOs, and the like tend to have a large capacity, and are used in the self-excited inverter. In particular, a pulse-width modulation (PWM) controlled inverter can supply a sine wave current to a motor. Therefore, an AC variable-speed motor of a low noise and producing small torque ripples can be realized. Meanwhile, various control techniques, such as V/f=constant control, slip frequency control, vector control, and the like are available, and enable characteristics equivalent to those of the DC motors to be obtained.

A cycloconverter is known as a typical example which utilizes a voltage from an AC power source to effect natural commutation. The cycloconverter can supply a sine wave current to a motor, and its capacity can easily be increased by means of natural commutation. In particular, a reactive-power compensation type cycloconverter, in which an input power factor at a receiving end is controlled to be always 1, has received a great deal of attention (cf. U.S. Pat. No. 4,418,380 issued on Nov. 29, 1983; U. S. Pat. No. 4,570,214 issued on Feb. 11, 1983; or Japanese Patent Publication No. 59-14988).

The conventional AC motor drive apparatus has been utilized in a wide variety of fields while taking its advantage. However, an apparatus for driving a large-capacity, high-speed motor cannot be easily realized by means of the above-mentioned conventional techniques. More specifically, although the cycloconverter utilized natural commutation so that its capacity can be easily increased, since the cycloconverter has a low output frequency, it cannot be used for a high-speed operation. On the other hand, a self-excited inverter requires self-extinction elements such as transistors, GTOs, and the like. Therefore, the apparatus becomes expensive, and it is difficult to increase its capacity.

Since the commutatorless motor utilized natural commutation, its capacity can be easily increased, and high-speed operation can be easily achieved. However, the motor itself is commmplicated and bulky. Further, since a rectangular current is supplied to an armature winding, torque ripples of the motor are increased. In addition, problems associated with the manner of commutation at the beginning of energization and an insufficient overload strength still remain.

On the other hand, along with an increase in the capacity of the motor, the influence of reactive power generated from the power source and that of harmonic components of the reactive power cannot be ignored. Variations in reactive power cause variations in the power source system voltage, and adversely influence other electrical equipment connected to the the same power source system. A harmonic current induces induction problems in television systems, radio receivers, or communication lines, and harmonic components of the 3rd, 5th, 7th orders cannot easily be removed.

A reactive-power compensation type cycloconverter (cf. U.S. Pat. Nos. 4,418,380 and 4,570,214) is an effective means for solving the reactive power problem, which serves as a power converter for maintaining the input power factor of the receiving end constantly at 1. However, a harmonic current, depending on the output frequency, appears at the input side, and countermeasures must be taken thereagainst.

Recently, a power converter having the functions of both an AC power converter and an active filter has been proposed (e.g., Japanese Patent Disclosure (Kokai) No. 59-61475). An AC motor driving system, constituted by a combination of this power converter and a self-excited inverter, has received a great deal of attention.

In this system, since an input current is controlled to be a sine wave in the same phase as that of the power source voltage, a harmonic component is small, and the input power factor can be maintained to be always 1. However, the converter must be constituted by self-extinction elements such as transistors and GTOs. Therefore, a large-capacity system is difficult to realize and has an economical problem.

SUMMARY OF THE INVENTION

The present invention has been developed in consideration of the above situation and has as its object to provide a high-speed, large-capacity AC motor drive apparatus which can supply a sine wave current, of a frequency of 0 to several hundred Hz, to an AC motor (an induction motor, a synchronous motor, a reluctance motor, or the like), while maintaining the input power factor of a power source at 1, and can eliminate harmonic components.

To achieve the above object, an AC motor drive apparatus according to the present invention comprises an AC power source, a first cycloconverter, the output terminal of which is coupled to the AC power source, a phase-advanced capacitor coupled to the input terminal of the first cycloconverter, a second cycloconverter, the input terminal of which is coupled to the phase-advanced capacitor, and an AC motor coupled to the output terminal of the second cycloconverter. The first cycloconverter controls a current supplied from the AC power source, to be a sine wave (with a small harmonic component) having the same phase (input power factor=1) as that of a power source voltage, so that the voltage crest value of the phase-advanced capacitor becomes substantially constant. The second cycloconverter supplied a sine wave current of a frequency of a variable frequency (0 to several hundred Hz), to the AC motor.

More specifically, the first cycloconverter performs power conversion between the AC power source (a constant frequency of 50 Hz or 60 Hz) and the phase-advanced capacitor (a constant frequency of, for example, 500 Hz), and controls the current supplied from the AC power source, so that the voltage applied to the phase-advanced capacitor becomes substantially constant. At this time, the current supplied from the power source is controlled to be a sine wave in the same phase as that of the power source voltage, so that the input power factor can be maintained always at 1. Therefore, a current with small harmonic components can be supplied.

The second cycloconverter performs power conversion between the phase-advanced capacitor and the AC motor. The cycloconverter can supply a sine wave current of a frequency of about 0 to 500 Hz to an armature winding of the AC motor, while maintaining the frequency of the phase-advanced capacitor at a constant 500 Hz.

At this time, the phase-advanced capacitor serves as an advanced reactive power source for the two cycloconverters, and its frequency (e.g., 500 Hz) is determined so that the delayed reactive power of the two cycloconverters is equal the advanced reactive power of the phase-advanced capacitor. In other words, when a phase control reference signal for the converter is supplied from an external sine oscillator (at a frequency of 500 Hz) to the cycloconverters, the circulating currents of the cycloconverters flow so that the frequency and phase of the oscillator coincide with those of the phase-advanced capacitor voltage.

With the phase-advanced capacitor voltage established in this manner, the cycloconverters can perform power conversion simply by utilizing natural commutation. In addition, the cycloconverter can supply a sine wave current of a frequency of 0 to several hundred Hz to the AC motor, using the AC power source frequency of 50 Hz (or 60 Hz).

BRIEF DESCRIPTION OF THE DRAWINGS

FIG. 4 is an equivalent circuit diagram for explaining the operation of the circuit shown in FIG. 3;

FIGS. 5A to 5C are timing charts for explaining the operation of the apparatus shown in FIG. 1;

FIGS. 6A to 6D are timing charts for explaining another operation of the apparatus shown in FIG. 1;

FIG. 7 is an equivalent circuit diagram for explaining the operation principle of the apparatus shown in FIG. 1;

FIG. 8 is a block diagram showing an arrangement of a control circuit for cycloconverter CC-1 shown in FIG. 1;

DETAILED DESCRIPTION OF THE PREFERRED EMBODIMENTS

Figure 1:
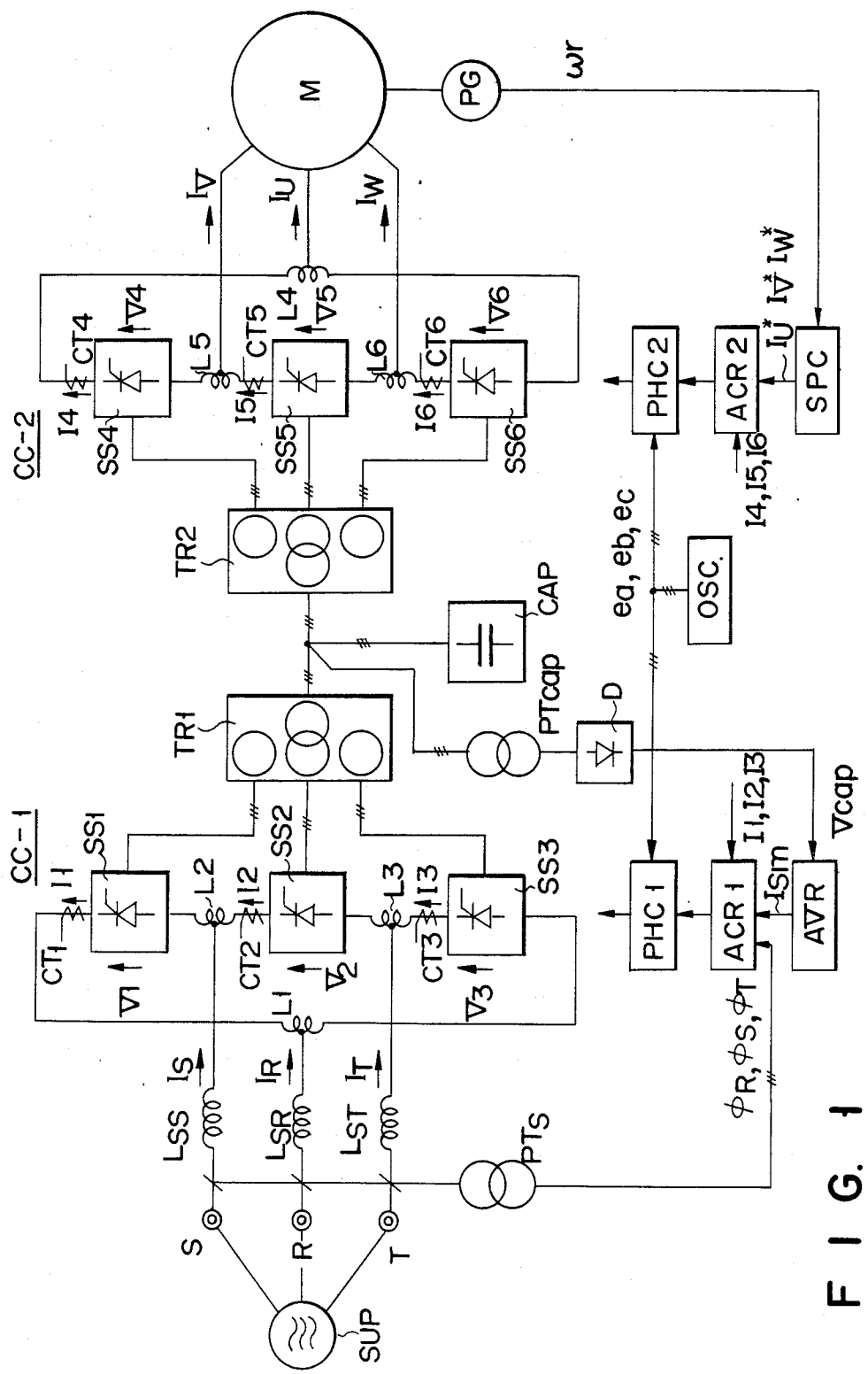
FIG. 1 is a block diagram showing an AC motor drive apparatus according to an embodiment of the present invention.

FIG. 1 is a block diagram showing an AC motor drive apparatus according to an embodiment of the present invention.

In FIG. 1, reference symbols R, S, and T denote receiving ends of three-phase AC power source SUP; CC-1, a first circulating current type cycloconverter; CAP, a high-frequency, phase-advanced capacitor; CC-2, a second circulating current type cycloconverter; and M, an AC motor (three-phase squirrel-cage type induction motor).

First circulating current type cycloconverter CC-1 is constituted by externally-excited converters SS1, SS2, and SS3, DC reactors L1, L2, and L3, and insulating transformer TR1. The output terminal of cycloconverter CC-1 is coupled to the three-phase AC power source through AC reactors LSR, LSS, and LST.

Second circulating current type cycloconverter CC-2 is constituted by externally-excited converters SS4, SS5, and SS6, DC reactors L4, L5, and L6, and insulating transformer TR2. The output terminal of cycloconverter CC-2 is coupled to AC motor M.

Input terminals of two cycloconverters CC-1 and CC-2 are coupled to high-frequency, phase-advanced capacitor CAP, respectively through insulating transformers TR1 and TR2.

A control circuit for these cycloconverters includes DC current detectors CT1 to CT6, AC voltage detectors PTs and PTcap, rotation pulse generator PG, diode D, three-phase reference voltage generator OSC, voltage controller AVR, speed controller SPC, current controllers ACR1 and ACR2, and phase controllers PHC1 and PHC2.

First cycloconverter CC-1 is a delta-connected circulating current type cycloconverter, and controls currents IR, IS, and IT supplied from the three-phase AC power source so that three-phase AC voltage applied to phase-advanced capacitor CAP are substantially made constant (this control method will be described later).

Second cycloconverter CC-2 is also a delta-connected circulating current type cycloconverter, and supplies a three-phase AC power of a variable voltage and a variable frequency to induction motor M using phase-advanced capacitor CAP as a three-phase voltage source (this control method will be described later).

Three-phase reference voltages ea, eb, and ec from external escillator OSC are used for the phase control of two cycloconverters CC-1 and CC-2, and frequencies and phases of voltages Va, Vb, and Vc of phase-advanced capacitor CAP match those of reference voltages ea, eb, and ec, respectively.

The operation of the above arrangement will be described hereinafter in detail.

The starting operation for establishing voltages Va, Vb, and Vc of phase-advanced capacitor CAP will first be described.

For the sake of simplicity, a case will be explained where second cycloconverter CC-2 is in a gate-off state at the time of starting.

Figure 2:
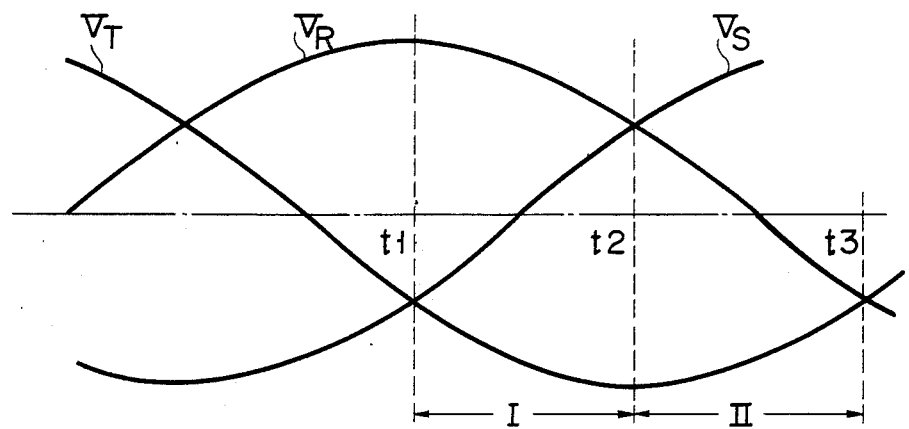
FIG. 2 is a voltage waveform chart for explaining the operation of the apparatus shown in FIG. 1.

FIG. 2 shows the voltage waveforms of the three-phase AC power source, and voltages can be expressed as follows:

$$VR = Vsm \cdot \sin \omega s \cdot t \qquad (1)$$

$$VS = Vsm \cdot \sin (\omega s \cdot t - 2\pi/3) \qquad (2)$$

$$VT = Vsm \cdot \sin (\omega s \cdot t + 2\pi/3) \qquad (3)$$

where Vsm is a crest value of a power source voltage, and $\omega s = 2\pi fs$ is a power source angular frequency.

If frequency fc at the input side (phase-advanced capacitor side) of cycloconverter CC-1 is considerably higher than frequency fs (50 Hz or 60 Hz) of the power source, power source voltages VR, VS, and VT can be replaced with DC voltages during a very short time interval.

Although voltages applied to the converters during intervals I and II in FIG. 2 have different polarities, the starting operation will be described hereinbelow with reference to interval I.

Figure 3:
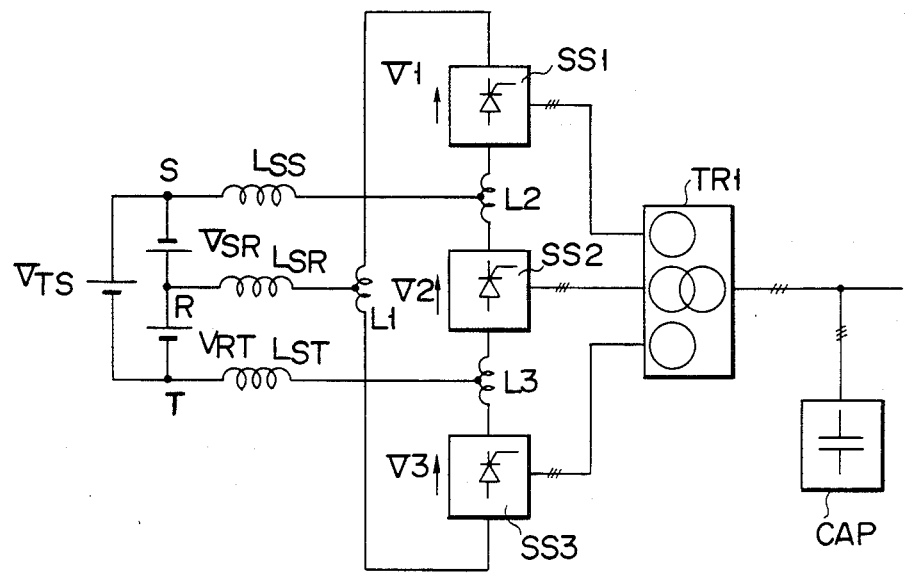
FIG. 3 is a circuit diagram partially showing the arrangement shown in FIG. 1.

FIG. 3 is a circuit diagram representing the polarity of the power source voltage applied to cycloconverter CC-1 during interval I in FIG. 2. Since reverse voltages are applied to converters SS1 and SS2, these converters cannot be turned on in response to trigger pulses. Therefore, phase-advanced capacitor CAP is charged through converter SS3.

FIG. 4 shows an equivalent circuit when forward voltage VRT is applied to converter SS3, and shows a case wherein trigger pulses are supplied to thyristors S1 and S5. Charging current IR flows through a passage defined by power source VRT+, thyristor S5, capacitor Cab, thyristor S1, reactor LS, and power source VRT− in the order named. Current IR also flows through a passage constituted by power source VRT+, thyristor S5, capacitor Cbc, capacitor Cca, thyristor S1, reactor LS, and power source VRT−. As a result, capacitor Cab is charged to power source voltage VR, and a voltage or VRT/2 is applied to capacitors Cbc and Cca. Capacitors Cab, Cbc, and Cca respectively correspond to three-phase capacitors of phase-advanced capacitor CAP in FIG. 3.

FIG. 5A shows a triggering mode of thyristors S1 to S5 of converter SS3. Trigger pulses are supplied in synchronism with a signal from three-phase reference voltage generator OSC shown in FIG. 1. After the state of FIG. 1 is established, trigger pulses are supplied to thyristor S6. Then, a reverse bias voltage is applied to thyristor S5 due to the voltage (VRT/2) charged by capacitor Cbc upon turning on of thyristor S6, the thyristor S5 is turned off. More specifically, at the time of starting, phase-advanced capacitor CAP serves as a commutation capacitor. When thyristors S1 and S6 are turned on, voltages applied to capacitors Cab, Cbc, and Cca are changed.

FIGS. 5B and 5C show waveforms of voltage Va-b appearing across terminals a and b in FIG. 4 and phase voltage Va when the thyristors are turned on in the mode shown in FIG. 5A. Since voltage Va-b is charged through reactor LS, it gradually rises, as indicated by the broken curve. If this time interval is given by $2\delta$, the fundamental wave component of Va-b is delayed by $\delta$. The phase of phase voltage Va is delayed by $(\delta/6)$ radian with respect to line voltage Va-b.

As can be understood from the comparison between the triggering mode shown in FIG. 5A and phase voltage Va, phase control angle $\alpha 3$ upon starting is given as:

$$\alpha 3 = \pi - \delta \text{(radian)} \qquad (4)$$

Since $\delta$ is not so large, converter SS3 is driven approximately at $\alpha 3 \approx 180$ degrees. At this time, output voltage V3 of converter SS3 is given as:

$$V3 = k \cdot Vcap \cdot \cos \alpha 3 \qquad (5)$$

where k is a linear constant, and Vcap is a phase voltage crest value of the capacitor. In this case, output voltage −V3 is balanced with power source voltage VRT. However, in this state, a voltage higher than power source voltage VRT cannot be charged on phase-advanced capacitor CAP.

Trigger phase angle $\alpha 3$ is slightly shifted in the 90-degree direction. Then, output voltage V3 represented by equation (5) is decreased to yield VRT > −V3. As a result, charging current IR is increased to increase capacitor voltage Vcap, and the voltage is balanced when VRT = −V3. In this case, IR is zero.

Vcap can be further increased in such a manner that angle $\alpha 3$ is further shifted in the 90-degree direction to decrease output voltage V3. If $\alpha 3 = 90$ degrees, $V3 = 0$ V, and theoretically, capacitor voltage Vcap can be charged to a large value even by very small power source voltage VRT. However, in practice, power supply must be performed in consideration of a loss of the circuit.

In this manner, voltage Vcap of phase-advanced capacitor CAP can be arbitrarily changed.

During interval II in FIG. 2, a forward voltage is applied to converters SS1 and SS3. In this case, phase-advanced capacitor CAP is charged through two converters. The output voltages from the converters are controlled to satisfy the following equations:

$$V1 = k \cdot Vcap \cdot \cos \alpha 1 = -VSR \qquad (6)$$

$$V3 = k \cdot Vcap \cdot \cos \alpha 3 = -VRT \qquad (7)$$

$$\therefore \cos \alpha 1 / \cos \alpha 3 = VSR/VRT \qquad (8)$$

Note that if $\cos \alpha 1 > (VSR/VRT) \cos \alpha 3$, $VSR < -V1$ is established, and a voltage cannot be charged through converter SS1 but can be charged through converter SS3.

Conversely, if $\cos \alpha 1 < (VSR/VRT) \cdot \cos \alpha 3$, a voltage can be charged only through converter SS1.

The voltages of phase-advanced capacitor CAP can be established in other intervals of FIG. 2.

The fact will be explained below in that the frequencies and phases of voltages Va, Vb, and Vc of phase-advanced capacitor CAP, established as described above, coincide with those of three-phase reference voltages ea, eb, and ec applied to phase controller PHC1.

When three-phase voltages VR, VS, and VT represented by equations (1), (2), and (3) are applied in a balanced state wherein power source currents IR, IS, and IT are zero, output voltages V1, V2, and V3 are respectively expressed as follows:

$$-V1 = VS - VR \quad (9)$$

$$-V2 = VT - VS \quad (10)$$

$$-V3 = VR - VT \quad (11)$$

For example, at time t1 in FIG. 2, $V1 = -V3$ and $V2 = 0$ are established. Changes in output voltages V1, V2, and V3 from the converters will be described below when $\alpha1 = 45$ degrees, $\alpha2 = 90$ degrees, and $\alpha3 = 135$ degrees.

FIGS. 6A and 6D show the relationship between phase control reference signals ea, eb, and ec and trigger pulse signals for the respective converters.

Reference signals ea, eb, and ec are supplied from external oscillator OSC, and can be respectively expressed as follows:

$$ea = \sin(\omega c \cdot t) \quad (12)$$

$$eb = \sin(\omega c \cdot t - 2\pi/3) \quad (13)$$

$$ec = \sin(\omega c \cdot t + 2\pi/3) \quad (14)$$

where $\omega c = 2\pi \cdot fc$ is a high-frequency angular frequency and is selected to be, e.g., $fc = 500$ Hz.

When the frequencies and phases of phase voltages Va, Vb, and Vc of phase-advanced capacitor CAP coincide with those of reference voltages ea, eb, and ec, the output voltages from the respective converters are expressed by:

$$V1 = k \cdot Vcap \cdot \cos \alpha1 \quad (15)$$

$$V2 = k \cdot Vcap \cdot \cos \alpha2 \quad (16)$$

$$V3 = k \cdot Vcap \cdot \cos \alpha3 \quad (17)$$

Therefore, $V1 + V2 + V3 = 0$, and the circulating current of cycloconverter CC-1 is not changed.

A case will be considered wherein it is assumed that the frequencies of the capacitor voltages are decreased, and voltages Va', Vb', and Vc' are obtained as indicated by broken curves.

The trigger phase angle of converter SS1 is changed from $\alpha1$ to $\alpha1'$, the trigger phase angle of converter SS2 is changed from $\alpha2$ to $\alpha2'$, and the trigger phase angle of converter SS3 is changed from $\alpha3$ to $\alpha3'$, respectively. As a result, $V1 + V2 + V3 > 0$, and the circulating current of cycloconverter CC-1 is increased. The circulating current serves as an input-side delayed reactive power when viewed from the side of phase-advanced capacitor CAP.

FIG. 7 shows an equivalent circuit for one phase of the input side of the cycloconverter. Cycloconverter CC-1 can be replaced with variable inductance Lcc for varying a delayed current. Resonance frequency fcap of this circuit is expressed by:

$$fcap = 1/(2\pi \sqrt{Lcc \cdot Ccap}) \quad (18)$$

Since an increase in circulating current corresponds to a decrease in equivalent inductance Lcc, frequency fcap is increased, and frequencies fcap of Va', Vb', and Vc' come closer to frequencies fc of reference voltages ea, eb, and ec.

If $fcap > fc$, the circulating current is decreased, variable inductance Lcc is increased, and they are balanced to provide $fcap = fc$.

If the phase of the voltage from phase-advanced capacitor CAP is delayed from that of the reference voltage, the circulating current is increased as in the case wherein $fcap < fc$, and the voltage phase of phase-advanced capacitor CAP is advanced. On the contrary, if the voltage phase of phase-advanced capacitor CAP is advanced from that of the reference voltage, circulating current I0 is decreased as in the case wherein $fcap > fc$, and the voltage phase of phase-advanced capacitor CAP is delayed. In this manner, the circulating current is automaticaly adjusted so that the frequencies and phases of voltages Va, Vb, and Vc of phase-advanced capacitor CAP respectively coincide with those of reference voltages ea, eb, and ec. Voltages Va, Vb, and Vc of phase-advanced capacitor CAP can be expressed by the following equations, respectively:

$$Va = Vcap \cdot \sin(\omega c \cdot t) \quad (19)$$

$$Vb = Vcap \cdot \sin(\omega c \cdot t - 2\pi/3) \quad (20)$$

$$Vc = Vcap \cdot \sin(\omega c \cdot t + 2\pi/3) \quad (21)$$

where Vcap is a voltage crest value.

Referring again to FIG. 1, an operation for controlling voltage crest value Vcap of phase-advanced capacitor CAP to be constant will be described below.

FIG. 8 shows a control circuit for first cycloconverter CC-1 shown in FIG. 1 in detail. This control circuit can correspond to that shown in FIG. 1 as follows.

Voltage controller AVR shown in FIG. 1 is constituted by voltage setting device VR, comparator C1, and voltage control compensation circuit Gc shown in FIG. 8.

Current controller ACR1 is constituted by multipliers ML1 to ML3, current converter D/S-1, comparators C2 to C4, current control compensation circuits GR, GS, and GT, and adders A1 to A3.

Phase controller PHC1 shown in FIG. 1 is constituted by phase controllers PHC11 to PHC13 shown in FIG. 8, and three-phase reference voltage generator OSC in FIG. 1 corresponds to reference voltage generator OSC in FIG. 8.

The three-phase voltage of phase-advanced capacitor CAP is detected by transformer PTcap, and is rectified by diode D. Voltage crest value Vcap of phase-advanced capacitor CAP is thus detected, and is input to comparator C1.

Voltage setting device VR outputs voltage instruction Vcap*, and instruction Vcap* is compared with detection value Vcap. Deviation $\epsilon c = Vcap^* - Vcap$ is input to voltage control compensation circuit Gc(S), and is integrally or linearly amplified thereby. For the sake of simplicity, asume that $Gc(S) = Kc$ and only linear amplification is performed. Output Ism from circuit Gc(S) serves as a crest value instruction for currents IR, IS, and IT supplied from the power source, and is input to multipliers ML1 to ML3.

Power source voltages VR, VS, and VT are detected by thyristor PTs and are multiplied with a reciprocal number of crest value Vsm, thereby obtaining three-phase unit sine waves $\phi R$, $\phi S$, and $\phi T$.

$$\phi R = (VR/Vsm) = \sin(\omega s \cdot t) \quad (22)$$

$$\phi S = (VS/Vsm) = \sin(\omega s \cdot t - 2\pi/3) \quad (23)$$

$$\phi T = (VT/Vsm) = \sin(\omega s \cdot t + 2\pi/3) \quad (24)$$

Three-phase unit sine waves $\phi R$, $\phi S$, and $\phi T$ are input to multipliers ML1 to ML3, respectively, and are multiplied by crest value Ism. The products serve as instructions IR*, IS*, and IT* for the currents supplied from the power source.

$$IR^* = Ism \cdot \sin A(\omega s \cdot t) \quad (25)$$

$$IS^* = Ism \cdot \sin(\omega s \cdot t - 2\pi/3) \quad (26)$$

$$IT^* = Ism \cdot \sin(\omega s \cdot t + 2\pi/3) \quad (27)$$

Actual currents IR, IS, and IT supplied from the power source are detected as follows.

Output currents I1, I2, and I3 from converters SS1 to SS3 are detected and current converter D/S-1 performs the following calculations to be based on the detected currents:

$$IR = I3 - I1 \quad (28)$$

$$IS = I1 - I2 \quad (29)$$

$$IT = I2 - I3 \quad (30)$$

Of course, actual currents IR, IS, and IT can be directly detected.

Current $I_R$ in an R phase is controlled as follows.

Current instruction IR* and detection value IR are input to comparator C2 to obtain deviation $\epsilon R = IR^* - IR$. Deviation $\epsilon R$ is input to current control compensation circuit GR(S) to be linearly amplified. If a linear constant is given as KR, output signal $KR \cdot \epsilon R$ from circuit GR(S) is inverted and is input to phase controller PHC11 through adder A1, and is also input without modification, to phase controller PHC13 through adder A3.

Phase controllers PHC11 to PHC13 are formed of known means, and compare output signals ea, eb, and ec from three-phase reference voltage generator OSC with phase control input voltage $v\alpha$, so that trigger pulse signals are obtained from respective intersecting points of the compared signals.

More specifically, when phase control input voltage $v\alpha 1$ is input to phase controller PHC11, control phase angle $\alpha 1$ is given by:

$$\alpha 1 = \cos^{-1}\{k\alpha \cdot v\alpha 1\} \quad (31)$$

where $k\alpha$ is a linear constant. Equation (31) can be rewritten as:

$$\cos \alpha 1 = k\alpha \cdot v\alpha 1 \quad (32)$$

Output voltage V1 from converter SS1 has the relationship represented by equation (15), and is given as:

$$V1 = k \cdot Vcap \cdot \cos \alpha 1 = k \cdot k\alpha \cdot Vcap \cdot v\alpha 1 \quad (33)$$

Then, $V1 \propto v\alpha 1$.

Similarly, $V2 \propto v\alpha 2$ and $V3 \propto v\alpha 3$.

Now, a case will be described wherein R-phase current IR is decreased to be smaller than instruction IR under the above conditions.

Deviation $\epsilon R = IR^* - IR$ becomes positive, and $KR \cdot \epsilon R$ is increased. Then, phase control input voltage $v\alpha 1 = -KR \cdot \epsilon R$ of controller PHC11 becomes negative. In contrast, phase control input voltage $v\alpha 3 = KR \cdot \epsilon R$ of controller PHC13 becomes positive and is increased.

Therefore, output voltage V1 from converter SS1 is increased in a direction opposite to the arrow shown in FIG. 1, and serves to decrease output current I1. Contrarily, output voltage V3 from converter SS3 is increased in the direction of arrow in FIG. 1, and serves to increase output current I3. As a result, R-phase current $IR = I3 - I1$ is increased, and comes closer to instruction IR*.

On the other hand, if $IR > IR^*$, deviation $\epsilon R$ becomes negative to increase output voltage V1 of converter SS1 in the direction of the arrow and to increase output voltage V3 of converter SS3 in the direction opposite to the arrow. Then, current I1 is increased and current I3 is decreased, and hence, R-phase current $IR = I3 - I1$ is decreased. Finally, the currents are balanced when $IR \approx IR^*$.

S- and T-phase currents IS and IT are similarly controlled.

When three-phase currents IR, IS, and IT are controlled at the same time, phase control input voltages $v\alpha 1$, $v\alpha 2$, and $v\alpha 3$ of the converters are expressed by the following equations, respectively:

$$v\alpha 1 = KS \cdot \epsilon S - KR \cdot \epsilon R \quad (34)$$

$$v\alpha 2 = KT \cdot \epsilon T - KS \cdot \epsilon S \quad (35)$$

$$v\alpha 3 = KR \cdot \epsilon R - KT \epsilon T \quad (36)$$

where KR, KS, and KT are linear magnifications if control compensation circuits GR(S), GS(R), and GT(S) are given by linear components only.

As can be seen from equations (34) to (36), sum $V1 + V2 + V3$ of the output voltages of the converters becomes zero, and the circulating current is no longer changed.

The R-, S-, and T-phase currents are controlled to respectively coincide with instructions IR*, IS*, and IT*. These instructions are sine waves in the same phases as those of power source voltages VR, VS, and VT.

In other words, the input power factor is always 1, and an operation with small harmonic components can be performed.

The control operation for voltage crest value Vcap of phase-advanced capacitor CAP will be described below.

If $Vcap^* > Vcap$, deviation $\epsilon c = Vcap^* - Vcap$ becomes positive, so that current crest value instruction $Ism = Kc \cdot \epsilon c$ becomes positive and is increased.

Therefore, input currents IR, IS, and IT for the respective phases are increased, and active power PS represented by the following equation is supplied from the power source.

$$PS = IR \cdot VR + IS \cdot VS + IT \cdot VT = (3/2) \cdot Vsm \cdot Ism \quad (37)$$

where Vsm is a voltage crest value and Ism is a current crest value.

As a result, energy PS·t is supplied from the power source to phase-advanced capacitor CAP, and is changed thereby as $(\frac{1}{2})C_{cap} \cdot V_{cap}^2$. Therefore, voltage Vcap is increased, and is finally balanced to yield Vcap=Vcap*.

In contrast to this, if Vcap*<Vcap, deviation εc becomes negative, and current crest value Ism also becomes negative. Therefore, energy $(\frac{1}{2})C_{cap} \cdot V_{cap}^2$ is regenerated to the power source as PS·t. Therefore, voltage Vcap is decreased, and is controlled to yield Vcap≈Vcap*. At this time R-, S-, and T-phase currents IR, IS, and IT are controlled to be sine waves in phases opposite to those of power source voltages VR, VS, and VT, respectively, and the input power factor=1 can be maintained.

As described above, the first circulating current type cycloconverter controls currents IR, IS, and IT supplied from the power source so that voltage crest value Vcap of phase-advanced capacitor CAP coincides with its instruction Vcap*. Since instructions IR*, IS*, and IT* of the currents are given as sine waves in the same phase (or opposite phase) as those of the power source voltages, the input power factor can always be maintained to be 1.

At this time, frequencies fcap and phases of the voltages of phase-advanced capacitor CAP respectively coincide with frequencies fc and phases of three-phase reference voltage signals ea, eb, and ec supplied from external oscillator OSC, as has been described before.

In this manner, in a state wherein voltages Va, Vb, and Vc of phase-advanced capacitor CAP are established, the operation is initiated in response to the gate signals (α4 to α6 in FIG. 9) delivered from second circulating current type cycloconverter CC-2.

As described above, constant-voltage, constant-frequency three-phase AC power, whose frequencies and phases are determined in accordance with three-phase reference voltage signals ea, eb, and ec, and whose voltage value is determined in accordance with voltage crest value instruction Vcap*, is supplied to second cycloconverter CC-2.

The control operation for the second cycloconverter will now be described.

Figures 9, 10:
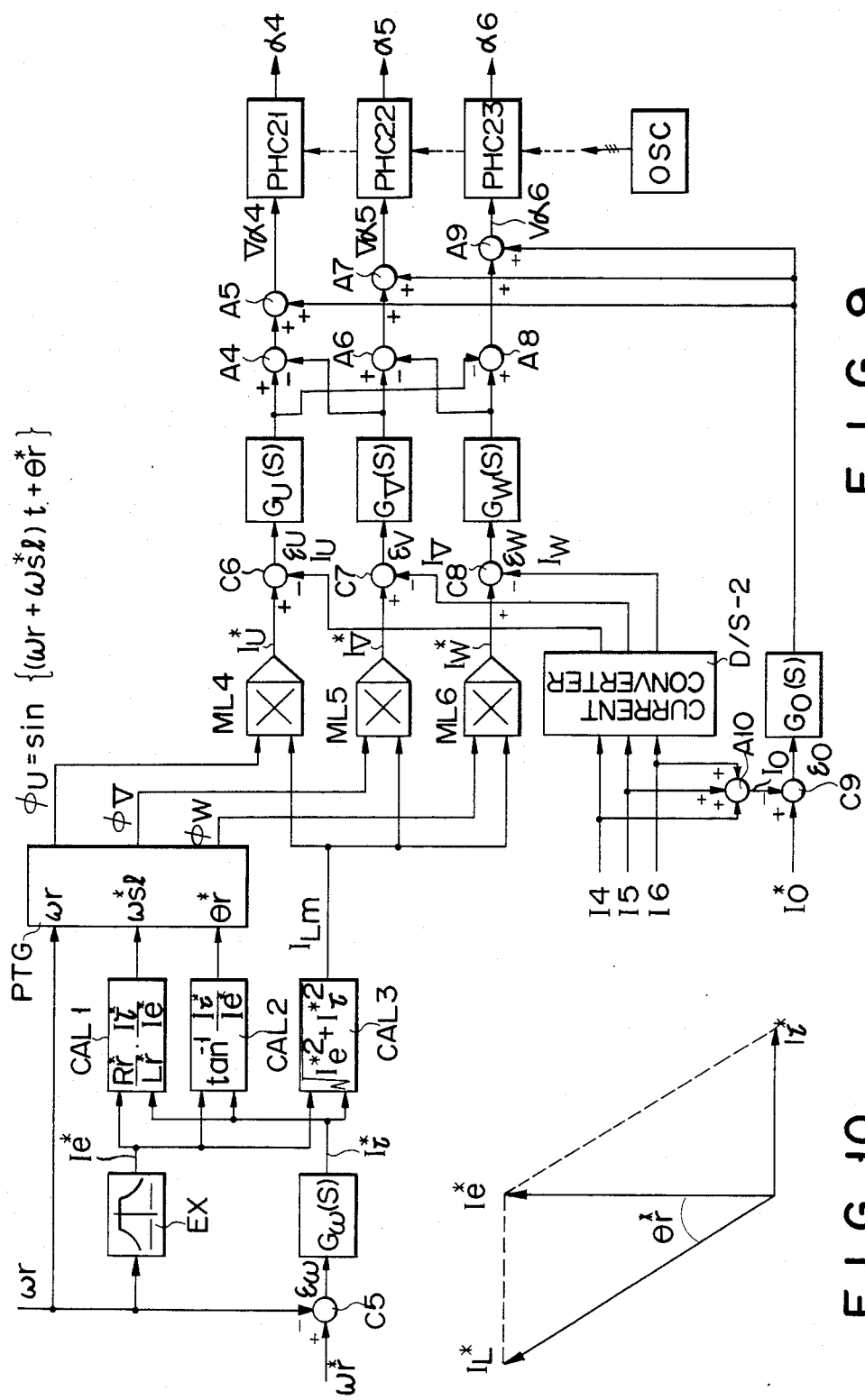
FIG. 9 is a block diagram showing an arrangement of a control circuit for cycloconverter CC-2 shown in FIG. 1.
FIG. 10 is a representation showing current vectors in order to explain the operation of the apparatus shown in FIG. 9.

FIG. 9 is a block diagram showing a detailed arrangement of a control circuit for second cycloconverter CC-2 shown in FIG. 1. The circuit shown in FIG. 9 can correspond to that in FIG. 1 as follows.

Speed controller SPC shown in FIG. 1 is constituted by comparator C5, speed control compensation circuit Gω(s), excitation current setting device EX, calculation circuits CAL1 to CAL3, three-phase sine pattern generator PTG, and multipliers ML4 to ML6 shown in FIG. 9.

Current controller ACR2 is constituted by comparators C6 to C9, current converter D/S-2, current control compensation circuits Gu, Gv, Gw, and Go, and adders A4 to A10 shown in FIG. 9.

Phase controller PHC2 shown in FIG. 1 is constituted by phase controllers PHC21 to PHC23 shown in FIG. 9.

Reference voltage generator OSC shown in FIG. 9 corresponds to reference voltage generator OSC shown in FIG. 1, and is the same as OSC in FIG. 8.

The speed control operation for induction motor M will now be described.

A vector control induction motor is known wherein a vector component of secondary current Iτ of the induction motor is determined to be orthogonal to that of excitation current Ie so that they can be independently controlled. In the following description, a motor of this type, that employs this scheme to perform speed control, will be exemplified.

Incidentally, since various literatures about vector control have been published (cf. U.S. Pat. No. 4,259,629 issued on Mar. 31, 1981, and U.S. Pat. No. 4,267,499 issued on May 12, 1981). Therefore, a detailed description thereof is omitted, and vector control will be briefly described below.

A pulse train proportionaal to rotation speed ωr is delivered from pulse generator PG directly coupled to a rotor of the motor.

Comparator C5 compares rotation speed ωr with its instruction ωr*, and supplies deviation εw(=ωr*−ωr) to speed control compensation circuit Gω(S). Circuit Gω(S) includes linear components or integral components, etc. and generates torque current instruction Iτ* as its output.

Rotation speed detection value ωr is input to excitation current setting device EX and is converted to excitation current instruction Ie*.

Torque current instruction Iτ* and excitation current instruction Ie* are input to calculation circuits CAL1 and CAL3 and are subjected to following calculations.

More specifically, calculation circuit CAL1 performs the following calculation to obtain slip angular frequency ωsl*.

$$\omega sl^* = (Rr^*/Lr^*)(I\tau^*/Ie^*) \quad (38)$$

Rr*: secondary resistance
Lr*: secondary inductance

Calculation circuit CAL2 performs the following calculation to obtain phase angle θr* of primary current instruction IL* with respect to excitation current instruction Ie*:

$$\theta r^* = \tan^{-1}(I\tau^*/Ie^*) \quad (39)$$

Calculation circuit CAL3 performs the following calculation to obtain crest value ILm of primary current instruction IL*:

$$ILm = \sqrt{Ie^{*2} + I\tau^{*2}} \quad (40)$$

FIG. 10 is a current vector chart of the induction motor. Excitation current Ie* and secondary current (torque current) Iτ* have the orthogonal relationship therebetween, and generation torque Te from the motor can be expressed by the following equation:

$$Te = Ke \cdot I\tau^* \cdot Ie^* \quad (41)$$

Normally, excitation current instruction Ie* is set to be constant, and generation torque Te of the motor can be controlled by changing secondary current instruction (torque current instruction) Iτ*. When the motor is driven at a rotation speed exceeding a given rated value, field-weakening control is performed such that excitation current instruction Ie* may be changed by excitation current setting device EX in accordance with rotation speed ωr.

Slip angular frequency ωsl*, phase angle θ*, and rotation angular frequency (rotation speed detection value) ωr obtained described above are input to sine pattern generator PTG, thus obtaining three-phase unit sine waves φu, φv, and φw.

$$\phi u = \sin\{(\omega r + \omega sl^*)\cdot t + \theta r^*\} \tag{42}$$

$$\phi v = \sin\{(\omega r + \omega sl^*)\cdot t + \theta r^* - 2\pi/3\} \tag{43}$$

$$\phi w = \sin\{(\omega r + \omega sl^*)\cdot t + \theta r^* + 2\pi/3\} \tag{44}$$

Unit sine waves $\phi u$, $\phi v$, and $\phi w$ determine the frequency and phase of primary current IL supplied to induction motor M.

These three-phase unit sine waves $\phi u$, $\phi v$, and $\phi w$ are multiplied with crest value instruction ILm by multipliers ML4 to ML6, to thereby obtain instructions Iu*, Iv*, and Iw* of three-phase current (primary current) supplied to induction motor M.

$$Iu^* = ILm \cdot \sin\{(\omega r + \omega sl^*)\cdot t + \theta r^*\} \tag{45}$$

$$Iv^* = ILm \cdot \sin\{(\omega r + \omega sl^*)\cdot t + \theta r^* - 2\pi/3\} \tag{46}$$

$$Iw^* = ILm \cdot \sin\{(\omega r + \omega sl^*)\cdot t + \theta r^* + 2\pi/3\} \tag{47}$$

The characteristic feature of vector control of the induction motor lies in that excitation current Ie and secondary current I$\tau$ can be independently controlled. Therefore, when secondary current I$\tau$ is changed while maintaining excitation current Ie of the motor to be constant, the generation torque can be controlled, and a speed control response equivalent to that of a DC motor can be attained.

An operation for controlling actual currents Iu, Iv, and Iw in accordance with primary current instructions Iu*, Iv*, and Iw* given as described above will now be described.

Output currents I4, I5, and I6 of the converters of the second cycloconverter are respectively detected by transformers CT4, CT5, and CT6, and are input to current converter D/S-2. Current converter D/S-2 performs the following calculations, and obtains primary currents Iu, Iv, and Iw from output currents I4 to I6 of the converters:

$$Iu = I4 - I6 \tag{48}$$

$$Iv = I5 - I4 \tag{49}$$

$$Iw = I6 - I5 \tag{50}$$

Motor primary current detection values Iu, Iv, and Iw are respectively input to comparators C6 to C8, and are compared with instructions Iu*, Iv*, and Iw*.

The control operation will be described below with reference to a U-phase current.

Actual current Iu and instruction Iu* are compared by comparator C6, and deviation $\epsilon u(=Iu^* - Iu)$ is input to current control compensation circuit Gu(S). Circuit Gu(S) performs integral or linear amplification, and supplies its output to phase controller PHC21 through adders A4 and A5. An inverted value of an output from current control compensation circuit Gu(S) is input to PHC23 through adders A8 and A9.

Output voltages V4 to V6 from converters SS4 to SS6 are proportional to input voltages v$\alpha$4 to v$\alpha$6 of phase controllers PHC21 to PHC23.

Therefore, if Iu*>Iu is established, deviation $\epsilon u$ becomes positive so that input voltage v$\alpha$4 of phase controller PHC21 is increased through control compensation circuit Gu(S), and then output voltage V4 from converter SS4 is increased in a direction indicated by an arrow in FIG. 1. At the same time, deviation $\epsilon u$ causes input voltage v$\alpha$6 of phase controller PHC23 to decrease, and causes converter SS6 to generate output voltage V6 in a direction opposite to the arrow in FIG. 1. As a result, output current I4 from converter SS4 is increased, and output current I6 from converter SS6 is decreased. Therefore, U-phase current Iu of the motor, represented by equation (48) is increased, and is controlled to establish Iu$\approx$Iu*.

In contrast to this, if Iu*<Iu is established, deviation $\epsilon v$ becomes negative, and output voltage V4 is decreased and V6 is increased. Therefore, $Iu(=I4-I6)$ is decreased, and hence, Iu is controlled to establish Iu$\approx$Iu*. If instruction Iu* is changed along a sine curve, an actual current is also controlled to have Iu$\approx$Iu* accordingly, and a sine wave current can be supplied to induction motor M.

V-phase current Iv and W-phase current Iw are similarly controlled.

Therefore, rotation speed $\omega r$ of induction motor M is controlled as follows.

If $\omega r^* > \omega r$, deviation $\epsilon \omega$ becomes positive, and torque current (secondary current) instruction I$\tau$* is increased through control compensation circuit G$\omega$(S). As a result, primary current instruction IL* (Iu*, Iv*, Iw*) of the induction motor shown in FIG. 11 causes crest value ILm and phase angle $\theta r^*$ to increase, and actual currents Iu, Iv, and Iw are controlled to be increased accordingly.

Therefore, actual secondary current I$\tau$ of induction motor M is increased to enlarge generation torque Te, thereby accelerating the motor. Thus, $\omega r$ is increased, and is controlled to establish $\omega r = \omega r^*$.

Contrarily, if $\omega r^* < \omega r$, deviation $\epsilon w$ becomes negative, torque current instruction I$\tau$* is decreased so that crest value ILm and phase angle $\theta L^*$ of primary current instruction IL* (Iu*, Iv*, Iw*) decrease. Therefore, generation torque Te is decreased. Then, rotation speed $\omega r$ is controlled to be decreased so that $\omega r \approx \omega r^*$ is obtained.

Circulating current control of the second cycloconverter will now be described.

As has been described above, the circulating current of first cycloconverter CC-1 is automatically adjusted, so that frequency fcap and the phase of a voltage from phase-advanced capacitor CAP coincide with those of signals ea, eb, and ec from three-phase reference voltage generator OSC.

It can be considered that the circulating current of second cycloconverter CC-2 is automatically adjusted in the same manner as described above. In this case, the circulating currents of the cycloconverters flow in a manner that the sum of the delayed reactive powers of the first and second cycloconverters cancels out the advanced reactive power of phase-advanced capacitor CAP. Therefore, a larger circulating current can flow in one of the cycloconverters than in the other one. For this reason, the circulating current of second cycloconverter CC-2 is controlled to be identified.

In FIG. 9, detection values of output currents I4 to I6 of the converters in second cycloconverter CC-2 are input to adder A10, thereby obtaining sum current I0 expressed by the following equation:

$$I0 = I4 + I5 + I6 \tag{51}$$

Sum current I0 is input to comparator C9 and is compared with its instruction I0*. Deviation $\epsilon 0 = I0^* - I0$ is input to adders A5, A7, and A9 through control compensation circuit G0(S).

Therefore, input voltages $v\alpha 4$ to $v\alpha 6$ to phase controllers PHC21 to PHC23 are expressed as follows:

$$v\alpha 4 = \epsilon u \cdot Gu - \epsilon v \cdot Gv + \epsilon 0 \cdot G0 \quad (52)$$

$$v\alpha 5 = \epsilon v \cdot Gv - \epsilon w \cdot Gw + \epsilon 0 \cdot G0 \quad (53)$$

$$v\alpha 6 = \epsilon w \cdot Gw - \epsilon u \cdot Gu + \epsilon 0 \cdot G0 \quad (54)$$

Therefore, the sum of the output voltages of the converters is as follows, and is proportional to deviation $\epsilon 0$:

$$V1 + V2 + V3 = Kc \cdot 3\epsilon 0 \cdot G0 \quad (55)$$

where Kc is a proportional constant.

When $I0^* > I0$, deviation $\epsilon 0$ becomes positive and causes $V1+V2+V3$ to increase, causes the circulating current to increase, and causes sum current I0 to increase. Finally, the currents are balanced when $I0 \approx I0^*$.

Conversely, when $I0^* < I0$, deviation $\epsilon 0$ becomes negative, so that the sum $V1+V2+V3$ is less than 0 and the circulating current decreases. Therefore, the current is controlled to establish $I0 \approx I0^*$.

As described above, when sum current I0 of second cycloconverter CC-2 is controlled to be substantially constant, the delayed reactive power of cycloconverter CC-2, viewed from the side of phase-advanced capacitor CAP, becomes substantially constant, and the delayed reactive power of first cycloconverter CC-1 also becomes substantially constant accordingly.

Note that not the sum current but the circulating current of second cycloconverter CC-2 can be detected and can be controlled to be substantially constant. In this case, the delayed reactive power of second cycloconverter CC-2 is changed in accordance with a load, and the circulating current of first cycloconverter CC-1 is automatically adjusted accordingly, so that the sum of the delayed reactive powers of the first and second cycloconverters becomes substantially equal to the advanced reactive power of phase-advanced capacitor CAP.

In the above description, the circulating current (or the sum current) of second cycloconverter CC-2 is controlled to coincide with its instruction, and the circulating current of first cycloconverter CC-1 is not controlled. However, the circulating current (or the sum current) of first cycloconverter CC-1 may be controlled to coincide with its instruction, and the circulating current of second cycloconverter CC-2 may be left non-controlled.

Figure 11:
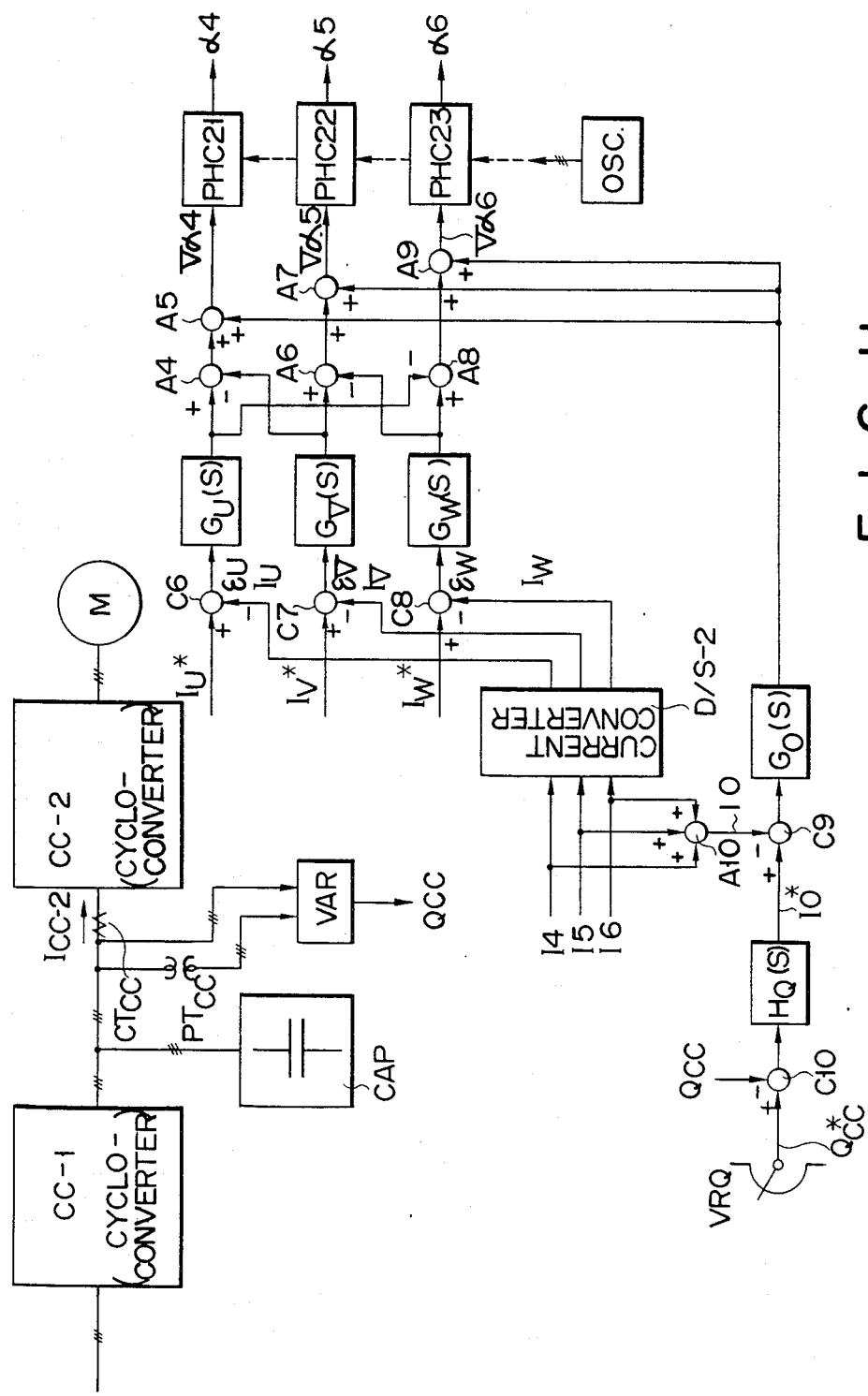
FIG. 11 is a block diagram showing another arrangement of the apparatus shown in FIG. 9.

FIG. 11 is a block diagram showing an apparatus according to another embodiment of the present invention.

In FIG. 11, reference symbol CTcc denotes a transformer for detecting three-phase input current Icc-2 of second cycloconverter CC-2; PTcc, a transformer for detecting a three-phase voltage of the input side (the phase-advanced capacitor side) of cycloconverter CC-2; VAR, a reactive power calculation circuit; VRQ, a reactive power setting device; C10, a comparator; and HQ, a reactive power control compensation circuit. Other symbols denote the same parts as those in FIGS. 1 and 9.

In this embodiment, the delayed reactive power Qcc of second cycloconverter CC-2 is controlled to be constant.

More specifically, input current Icc-2 and input voltage Vcc of second cycloconverter CC-2 are detected, and the detected current and voltage are input to reactive power calculation circuit VAR, thereby obtaining delayed reactive power Qcc of cycloconverter CC-2. Detection value Qcc of the reactive power and its instruction Qcc* are input to comparator C10 in order to calculate deviation $\epsilon Q = Qcc^* - Qcc$. This deviation is input to control compensation circuit HQ(S). Circuit HQ(S) integrally or linearly amplifies deviation $\epsilon Q$ and provides instruction I0* of the sum current of second cycloconverter CC-2.

Control for sum current I0 is as described with reference to FIG. 9.

If $Qcc^* > Qcc$, deviation $\epsilon Q$ becomes positive, and causes sum current instruction I0* to increase through circuit HQ(S). Therefore, delayed reactive power Qcc of cycloconverter CC-2 is increased, and is controlled to yield $Qcc \approx Qcc^*$.

If $Qcc^* < Qcc$, deviation $\epsilon Q$ becomes a negative value, and sum current instruction I0* is decreased to decrease Qcc. Then, the current is balanced when $Qcc \approx Qcc^*$.

In this manner, delayed reactive power Qcc of second cycloconverter CC-2 is controlled to be constant, so that the delayed reactive power of first cycloconverter CC-1 can be rendered constant. Therefore, the reactive powers of the cycloconverters can be maintained to be constant regardless of the magnitude of the load. Therefore, the frequency and phase of the voltage of phase-advanced capacitor CAP is stabilized, and can serve as a high-frequency power source which is not influenced by variations in load.

When setting value Qcc* of the reactive power is set to be $\frac{1}{2}$ delayed reactive power Qcap of phase-advanced capacitor CAP, the reactive power to be shared by both of the cycloconverters can be equal to each other, and no overload is applied to either cycloconverter.

The above characteristic features can be obtained if the circulating current is controlled instead of sum current I0.

Figure 12:
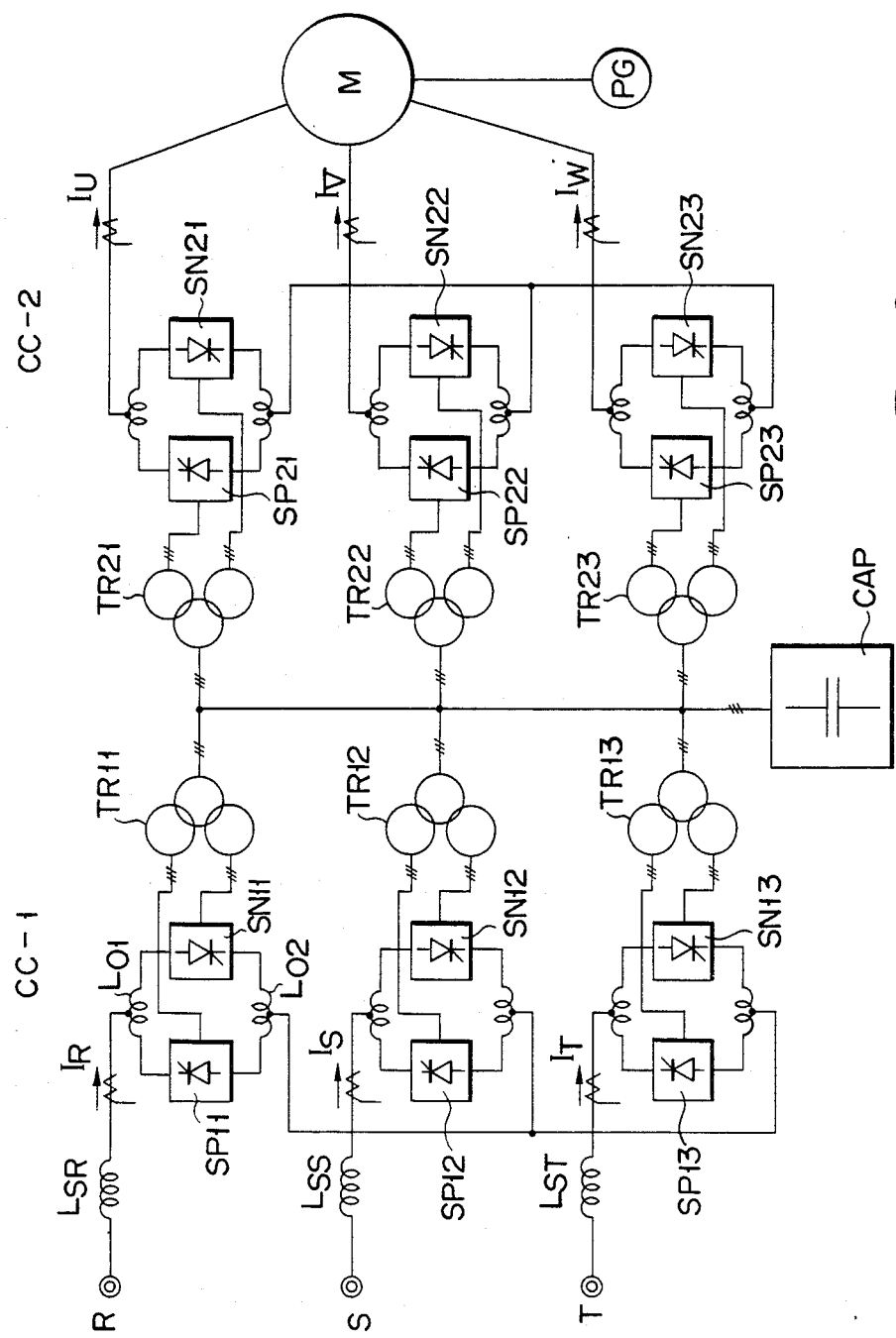
FIG. 12 is a block diagram showing a modification of the apparatus shown in FIG. 1.

FIG. 12 is a block diagram showing a modification of FIG. 1. In this embodiment, the principal circuit arrangements of first and second cycloconverters are modified.

In FIG. 12, reference symbols SP11, SP12, SP13, SP21, SP22, and SP23 denote positive-group converters; SN11, SN12, SN13, SN21, SN22, and SN23, negative-group converters; TR11, TR12, TR13, TR21, TR22, and TR23, insulating transformers; and L01 and L02, DC reactors. Other symbols denote the same parts as those in FIG. 1.

First and second circulating current type cycloconverters CC-1 and CC-2 are constituted by positive- and negative-group converters for each phase, and the circulating currents flow through the positive- and negative-group converters, respectively.

The embodiment shown in FIG. 1 is called a deltaconnected circulating current type cycloconverter, while the embodiment shown in FIG. 12 is called a positive-negative converter style circulating current type cycloconverter.

In the embodiment shown in FIG. 1, since the number of converters can be half that in the embodiment shown in FIG. 12, it is economical. However, in the cycloconverter shown in FIG. 12, output currents (Iu, Iv, Iw, etc.) can be independently controlled for each phase, so that a circuit design can become simple.

In each of the embodiments shown in FIGS. 1 and 12, the insulating transformer is inserted at the input side (phase-advanced capacitor side), but may be arranged at the output side, like transformer MTR in FIG. 13 (to be described later), of the main circuit arrangement shown in FIG. 12.

In order to drive AC motor M at high speed, however, at least the insulating transformers for the second cycloconverter must be inserted at the input side so as to increase the number of control pulses (control phases).

The AC motor drive apparatus described above can provide the following advantages. (1) A frequency of a current supplied to a motor falls within the range of about 0 to 500 Hz.

More specifically, when the number of control pulses (control phases) of second cycloconverter CC-2 is selected to be about 24 pulses, its output frequency fO can be controlled to exceed input frequency fcap. Then, when frequency fcap of the voltage of phase-advanced capacitor CAP is selected to be about 500 Hz, the motor can be driven with a condition that frequencies of currents Iu, Iv, and Iw supplied to the motor fall within the range of 0 to 500 Hz.

Therefore, the rotation speed of a two-pole AC motor can reach 30,000 rpm, and an ultra-high speed operation can be realized. For this reason, in a blower motor with which gears must be used to accelerate its rotation speed, acceleration gears can be omitted. Thus, operation efficiency can be improved, and the motor can be rendered compact and lightweight.

When the rotation speed is set at a low speed, e.g., 3,000 rpm, the number of poles of the motor can be set to be 20. Then, not only torque ripple components at the low speed can be eliminated but also speed control precision can be improved 10 times or more the two-pole motor operated under 50 Hz for 3,000 rpm. (2) Currents Iu, Iv, and Iw supplied to motor M are controlled to be sine waves, and the apparatus having very small torque ripple components can be obtained. At the same time, electromagnetic noise can be eliminated, and a cause of environmental pollution can be removed. (3) A current supplied from the power source is controlled to be a sine wave in the same phase as that of the power source voltage, so that the input power factor can be controlled to always be 1. In addition, harmonic components included in the input current can be eliminated. The input power factor=1 means that the reactive power can be made zero. Thus, the required capacity of a power source system can be reduced, and variations in voltage associated with variations in reactive power can be prevented. Therefore, an apparatus providing no adverse influences on other electrical equipment can be obtained. An induction trouble caused by the harmonic components can be avoided, and an adverse influence on the neighboring communication lines can be eliminated. (4) Since converters SS1 to SS6 are natural commutation converters (separately-excited converters) which are commutated utilizing an AC voltage applied to phase-advanced capacitor CAP, self-extinction elements such as high-power transistors, GTOs, and the like, are not necessary, and a system with high reliability, a high overload resistance, and a large capacity can be provided.

Figure 13:
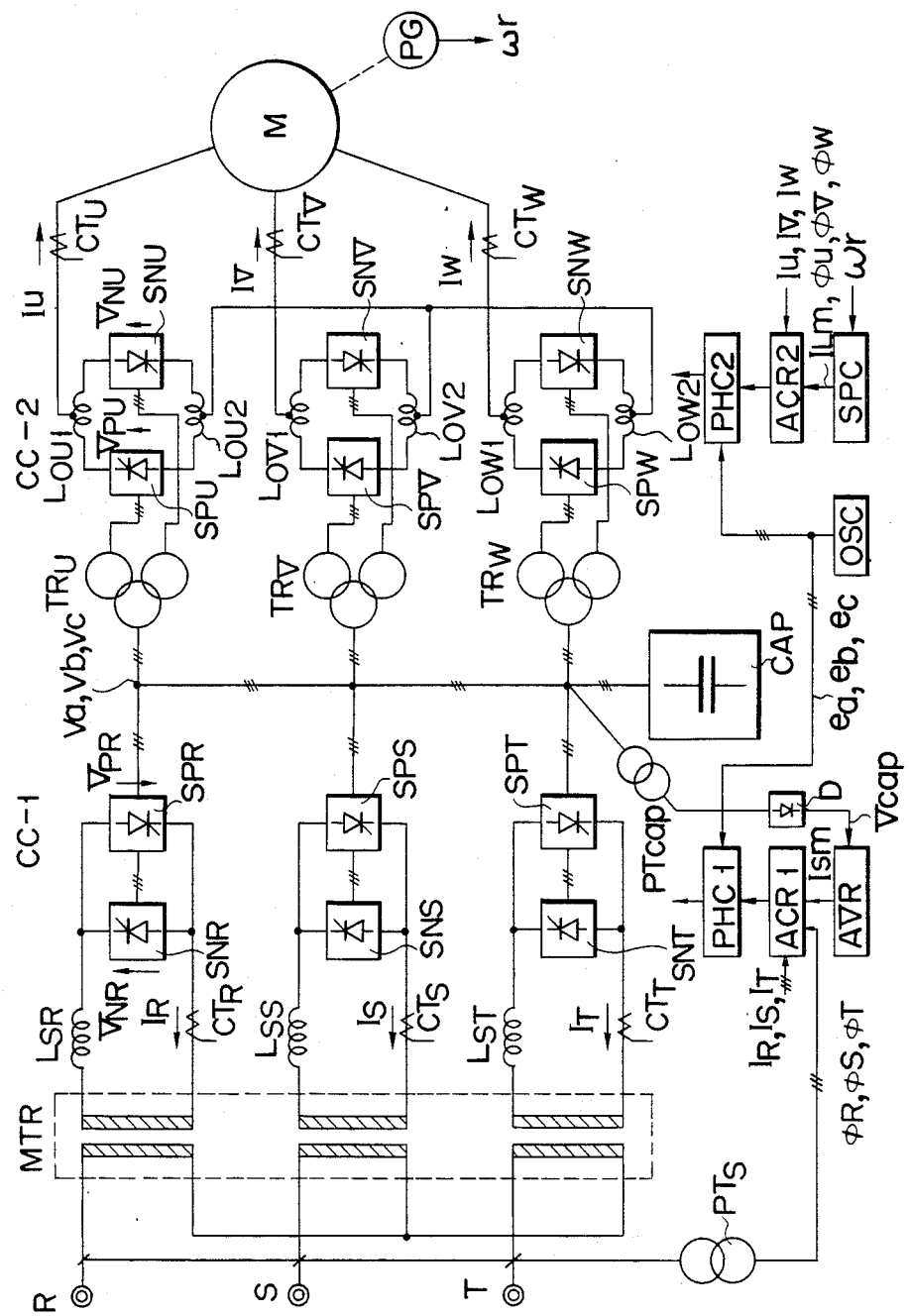
FIG. 13 is a block diagram showing an AC motor drive apparatus according to another embodiment of the present invention.

FIG. 13 is a block diagram showing an AC motor drive apparatus according to another embodiment of the present invention.

In FIG. 13, reference symbols R, S, and T denote receiving ends of a three-phase power source; MTR, a power source transformer; CC-1, a non-circulating current type cycloconverter; CAP, a delta- or λ-connected high-frequency three-phase phase-advanced capacitor; TRU, TRV, and TRW, insulating transformers; CC-2, a circulating current type cycloconverter; and M, an AC motor (three-phase squirrel-cage type induction motor).

Non-circulating current type cycloconverter CC-1 is divided into arrangements for R-, S-, and T-phases, and the output terminals thereof are connected to power source transformer MTR respectively through AC reactors LSR, LSS, and LST.

An R-phase cycloconverter is constituted by positive-group converter SPR and negative-group converter SNR. An S-phase cycloconverter is constituted by positive-group converter SPS and negative-group converter SNS. A T-phase cycloconverter is constituted by positive-group cycloconverter SPT and negative group cycloconverter SNT.

Circulating current type cycloconverter CC-2 is divided into arrangements for U-, V- and W-phases, and output terminals thereof are connected to an armature winding of AC motor M.

A U-phase cycloconverter is constituted by positive-group converter SPU and negative-group converter SNU, and DC reactors Lou1 and Lou2. Two converters SPU and SNU are insulated at their input sides by insulating transformer TRU.

Similarly, a V-phase cycloconverter is constituted by positive-group converter SPV and negative-group converter SNV, and DC reactors Lov1 and Lov2. A W-phase cycloconverter is constituted by positive-group converter SPW and negative-group converter SNW, and DC reactors Low1 and Low2. These converters are insulated at their input sides by insulating transformers TRV and TRW.

The input terminals of cycloconverters CC-1 and CC-2 are connected to high-frequency phase-advanced capacitor CAP.

A control circuit therefor includes rotation pulse generator PG directly coupled to the motor, current transformers CTR, CTS, CTT, CTU, CTV, and CTW, potential transformers PTs and PTcap, diode D, voltage controller AVR, speed controller SPC, current controllers ACR1 and ACR2, and phase controllers PHC1 and PHC2.

Non-circulating current type cycloconverter CC-1 controls currents IR, IS, and IT supplied from the three-phase AC power source, so that crest values Vcap of three-phase AC voltages Va, Vb, and Vc, applied to high-frequency, phase-advanced capacitor CAP, are substantially made constant.

Circulating current type cycloconverter CC-2 supplies a three-phase AC power of a variable voltage and variable frequency to induction motor M, using high-frequency, phase-advanced capacitor CAP as the three-phase voltage source. At the same time, a circulating current supplied to cycloconverter CC-2 is automatically adjusted, so that frequencies and phases of the voltages applied to phase-advanced capacitor CAP coincide with those of externally applied three-phase reference voltages.

The arrangement shown in FIG. 13 can be modified such that R, S, and T terminals are coupled to AC motor M and the three-phase AC power source is coupled to the center taps of reactors Lou1, Lov1, and Low1. In this modification, cycloconverter CC-2 coupled to the AC power source serves as a circulating current type cycloconverter, and cycloconverter CC-1 coupled to terminals R, S, and T serves as a non-circulating current type cycloconverter.

In this embodiment, power conversion between the AC power source and phase-advanced capacitor CAP is performed by non-circulating current type cycloconverter CC-1. Therefore, the following advantages can be expected. (a) Input terminals of positive- and negative-group converters can be directly coupled to the phase-advanced capacitor so that an insulating transformer can be omitted. Then, the apparatus can be rendered compact accordingly, and operation efficiency can also be improved. (b) Each two elements (thyristors) of forward and reverse directions constituting the converter can be arranged on an identical cooling fin. Therefore, the converter can be simplified, and a compact, lightweight apparatus can be realized. (c) A DC reactor for suppressing a circulating current can be omitted. Thus, the operation efficiency can be improved, and a compact, lightweight apparatus can be realized.

In this embodiment, power conversion between the phase-advanced capacitor and the AC motor is performed by circulating current type cycloconverter CC-2. Therefore, the following advantages can still be expected.

(d) Since the circulating current type cycloconverter is used, the upper limit of the output frequency can be improved, and AC motor M can be driven at an ultrahigh speed.

(e) Since a high-frequency insulating transformer is inserted at the input side, the converters can be insulated from each other, and the number of control phases can be increased. For this reason, the capacity of the DC reactor can be decreased, and current pulsation supplied to the motor can be minimized.

(f) The circulating current of cycloconverter CC-2 is automatically adjusted so that frequencies and phases of voltages Va, Vb, and Vc applied to phase-advanced capacitor CAP coincide with those of external reference voltages ea, eb, and ec.

As described above, according to this embodiment, a system wherein a non-circulating current type cycloconverter and a circulating current type cycloconverter are coupled to a phase-advanced capacitor at their input terminals and a power of a variable voltage and a variable frequency (0 to several hundred Hz) is supplied from an AC power source (50 Hz or 60 Hz) to an AC motor, can be provided.

According to the present invention, a sine wave current of 0 to several hundred Hz can be supplied to an AC motor, the input power factor of the power source can be maintained to be 1, and high-speed, large-capacity AC variable speed operation can be realized while suppressing harmonic leakage to the power source.

What is claimed is:

1. An AC motor drive apparatus comprising:
a first cycloconverter having an output terminal coupled to an AC power source;
a second cycloconverter having an output terminal coupled to an AC motor;
a phase-advanced capacitor, coupled to input terminals of said first and second cycloconverters, for commutating said cycloconverters by an AC voltage charged therein; and
an external oscillator means for supplying a reference signal to said first and second cycloconverters, said reference signal being used for phase-controlled said first and second cycloconverters;
wherein at least one of said first and second cycloconverters is a circulating current type.

2. An apparatus according to claim 1, wherein said first and second cycloconverters are of a circulating current type.

3. An apparatus according to claim 2, wherein said second cycloconverter is coupled to said phase-advanced capacitor via a second insulating transformer.

4. An apparatus according to claim 3, wherein said first cycloconverter is coupled to said phase-advanced capacitor via a first insulating transformer.

5. An apparatus according to claim 2, further comprising:
means for controlling a circulating current of one of said first and second cycloconverters, so that a sum of delayed reactive powers of said first and second cycloconverters is cancelled by an advanced reactive power of said phase-advanced capacitor.

6. An apparatus according to claim 1, wherein said second cycloconverter is of a circulating current type, and said first cycloconverter is of a non-circulating current type.

7. An apparatus according to claim 6, wherein said second cycloconverter is coupled to said phase-advanced capacitor via an insulatng transformer.

8. An apparatus according to claim 6, wherein said first cycloconverter is coupled to said AC power source via a power transformer.

9. An apparatus according to claim 1, wherein said first cycloconverter is of a circulating current type, and said second cycloconverter is of a non-circulating current type.

10. An apparatus according to claim 1, further comprising:
means, coupled to said first cycloconverter, for controlling a current flowing from said AC power source to said first cycloconverter, so that a voltage crest value charged in said phase-advanced capacitor reaches a predetermined value.

11. An apparatus according to claim 10, wherein said means for controlling the current is provided with means for controlling the current flowing to said first cycloconverter, in the same phase as, or the opposite phase to that of a voltage from said AC power source.

12. An apparatus according to claim 10, wherein said second cycloconverter supplies AC power to said AC motor, using a voltage charged in said phase-advanced capacitor,
said AC motor drive apparatus further comprising:
means, coupled to said second cycloconverter, for determining a frequency of the AC power supplied to said AC motor.

13. An apparatus according to claim 10, further comprising:
means, coupled to said AC motor and said second cycloconverter, for controlling said second cycloconverter so that an excitation current to said motor is decreased in accordance with an increase in rotation speed of said AC motor.

14. An AC motor drive apparatus comprising: an AC power source; a first circulating current type cycloconverter whose output terminal is coupled to said AC power source; a phase-advanced capacitor coupled to an input terminal of said first cycloconverter; a second circulating current type cycloconverter whose input terminal is coupled to said phase-advanced capacitor; an AC motor coupled to an output terminal of said second cycloconverter; first control means, coupled to said first cycloconverter, for controlling a current supplied from said AC power source, so that a voltage crest value of said phase-advanced capacitor becomes substantially constant; second control means, coupled to said second cycloconverter, for controlling a current supplied to said AC motor; and means, coupled to said second circulating current type cycloconverter, for determining a frequency of AC power supplied to said AC motor.

15. An AC motor drive apparatus comprising: an AC power source; a non-circulating current type cycloconverter whose output terminal is coupled to said AC power source via a power source transformer; a phase-advanced capacitor coupled to an input terminal of said non-circulating current type cycloconverter; a circulating current type cycloconverter whose input terminal is coupled to said phase-advanced capacitor via an insulating transformer; and an AC motor coupled to an output terminal of said circulating current type cycloconverter, wherein said non-circulating current type cycloconverter is provided with control means for controlling a current supplied from said AC power source to be a sine wave in the same phase as that of the power source voltage, so that a voltage crest value of said phase-advanced capacitor becomes substantially constant, wherein said circulating current type cycloconverter is provided with control means for controlling a current supplied to said AC motor, and wherein said circulating current type cycloconverter is coupled to means for determining a frequency of AC power supplied to said AC motor.

* * * * *